(12) United States Patent
Ness

(10) Patent No.: US 7,146,930 B1
(45) Date of Patent: *Dec. 12, 2006

(54) PET WATERER

(75) Inventor: William Van Ness, Clifton, NJ (US)

(73) Assignee: Van Ness Plastic Molding Co.,Inc., Clifton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/946,156

(22) Filed: Sep. 4, 2001

(51) Int. Cl.
*A01K 9/00* (2006.01)

(52) U.S. Cl. .............. 119/77; 119/72; 119/74; 141/353; 141/363; 141/364; 141/366

(58) Field of Classification Search ............... 119/77, 119/72, 74; 141/352, 363, 364, 366; D30/121, D30/122, 129–133
See application file for complete search history.

(56) References Cited

U.S. PATENT DOCUMENTS

| 1,446,701 | A | * | 2/1923 | Harris et al. ............ 119/73 |
| 1,538,483 | A | * | 5/1925 | Grantham ............ 141/352 |
| 1,816,684 | A | * | 7/1931 | Liechty ............ 119/77 |
| 1,820,835 | A | * | 8/1931 | Sauvageau ............ 119/77 |
| 2,097,719 | A | * | 11/1937 | Brembeck ............ 119/80 |
| 3,105,104 | A | * | 9/1963 | Neiss ............ 261/64.1 |
| 3,730,141 | A | * | 5/1973 | Manning et al. ............ 119/51.5 |
| 4,034,715 | A | * | 7/1977 | Arner ............ 119/51.5 |
| 4,134,365 | A | * | 1/1979 | Futers et al. ............ 119/51.5 |
| 4,281,624 | A | * | 8/1981 | Raines ............ 119/52.1 |
| 4,717,051 | A | * | 1/1988 | Leclerc ............ 222/545 |
| 5,653,270 | A | * | 8/1997 | Burrows ............ 141/18 |
| 5,730,082 | A | * | 3/1998 | Newman ............ 119/51.5 |
| 6,119,628 | A | * | 9/2000 | Lorenzana et al. ............ 119/77 |
| 6,257,288 | B1 | * | 7/2001 | Davidian et al. ............ 141/324 |
| 6,467,428 | B1 | * | 10/2002 | Andrisin et al. ............ 119/51.5 |
| 6,739,284 | B1 | * | 5/2004 | Olive ............ 119/74 |
| 6,883,025 | B1 | * | 4/2005 | Andra et al. ............ 119/72 |

FOREIGN PATENT DOCUMENTS

DE          36 19394 A1 *  1/1988

* cited by examiner

*Primary Examiner*—Andrea M. Valenti
(74) *Attorney, Agent, or Firm*—Thomas A. O'Rourke; Bodner & O'Rourke, LLP

(57) ABSTRACT

An improved pet waterer is disclosed. The pet waterer has a tray for holding a fluid. Extending upwardly from tray is a container for dispensing fluid to the tray. The container has a base and one or more sidewalls extending from the base and having a top edge on the sidewalls. The top edge of the sidewall forms the opening in the container opposite the base. The container has a removable lid covering the opening in the container. The lid has an orifice for passing fluid from the container to the tray.

18 Claims, 6 Drawing Sheets

FIG. 9

PET WATERER

Today, many households frequently have one or more pets, usually dogs and/or cats. One of the problems frequently encountered by pet owners is that there is not always someone home at the necessary times to attend to the basic needs of the family pet, i.e. food and water. The pet owner may be away for portions of the day working, at school or attending to other matters. Frequently, the pet owner can make arrangements for the pet to be cared for in these instances by a friend, neighbor or other family member that will look in on the pet from time to time and attend to the animal's needs. In many of these situations feeding the pet is not usually the problem. The feeding schedule for many pets can usually be arranged to be at convenient times for both the owner and the pet. Many pets eat at generally the same time each day and in these instances the pet owner can arrange his or her schedule to meet the needs of the pet. There are also products that are currently available for the pet owner to use to dispense quantities of food as needed by the pet. One example of these kinds of devices is shown in co-pending U.S. patent application Ser. No. 09/739,453 filed Dec. 18, 2000, the disclosures of which are incorporated herein by reference.

Although pets can be feed at certain times during the day, the same is not true for the pet's fluid needs. During the hot summers and other times during the year, the pet may need to receive water or other fluids on an as needed basis in order to maintain the pet's health. As a result, many pet owners rely on pet water dishes to provide the pet with water throughout the day. Many pet water dishes are merely just a bowl that is placed on the floor or other convenient spot to provide the pet with fluids. A mere bowl may not be sufficient however, for larger pets or during hot weather or when the owner is not going to be present for an extended period. In these instances there is a need for a bowl with a larger reservoir of water. While it is possible to provide a larger bowl for the pet, a larger bowl is problematical. For example, a larger bowl is more difficult to transport from the filling area to the pet's drinking location. The more water present increases the risk of spilling the water even after the bowl has been transported. Once the bowl is placed in position, a large bowl presents problems for the pet owner. Many dogs are not particularly neat or careful when imbibing and the more water present increases the risk of water dripping where it is not desired. Also, many pets have a tendency to tip the bowl over spilling the contents all over. Another problem with large quantities of water occurs where more water is present then the pet can conveniently drink over a reasonable period of time. In those instances the water can become contaminated with debris thus rendering it unpalatable at best or even unhealthy. Particles of food and other items have a tendency to be dropped into the water by the pet thereby soiling the water and creating a breeding ground for bacteria and contagion. As a result, there have been a number of attempts to solve the problem of providing sufficient fresh water to a pet for extended periods of time.

In many of these devices there is typically a tray portion, which provides a location for water to be presented to the pet to drink. The tray portion is filled with water that is supplied by a reservoir that is usually connected to the tray by some means. The location of the reservoir with respect to the tray is usually not important. As long as the combination is balanced and the pet can reach the tray to drink are the key aspects. As a result, there have been bowls or trays where the reservoir is placed at the rear of the tray, to one or the other sides, etc. In one type of waterer there is a first tray for food and a second tray for water with the reservoir for the water placed between the two trays.

In some instances, a tray is provided with a recess for receiving the opened end of a container. The container is filled at a faucet and carried to the tray's location where it is inverted and inserted into a connection in the tray. Alternatively, the container may be inverted in the area where it is filed and the tray and the inverted reservoir may be carried to the appropriate location.

In some instances the tray has a threaded portion for receiving the threaded end of a one or two liter soda bottle that is used as the reservoir for the tray. While the soda bottles are ubiquitous and conveniently available, many states have instituted bottle refund laws that require a purchaser of the soda or other beverage contained therein to pay a refundable deposit at the time of purchase. This deposit is refunded by the store where the soda was bought after use. Many people are reluctant to use these bottles for other applications because of the deposit. In addition, if the label is removed from the bottle no refund is available. Since, using the bottle to dispense water to a pet frequently causes the label to rip or fall off due to the moisture present in the vicinity, the bottle typically cannot be returned for a refund in many instances. Another downside to the use of a soda bottle is more an aesthetics issue. Soda bottles are not particularly attractive and usually come in only three colors, clear, green or brown. As a result, many pet owners are unhappy with the shape of the container, or the limited color selection and seek other types of water dispensers that are more decorative than the used soda bottle.

Even where there is a specially designed reservoir that is available for the pet owner to use, there are still issues that need to be addressed. One issue is the ability of the pet owner to clean the inside of the water reservoir to sanitize the container and remove a build up of scale or other discoloration covering over the interior surface of the container. Many parts of the country have hard water and if a container is used to dispense water to a pet for any extended period of time the interior surface of the container usually becomes coated with a film or covering of mineral deposits. The mineral deposits are unsightly but also prevent the pet owner from accurately ascertaining the clarity of the water contained in the reservoir and thus its freshness. In many parts of the country, if the container is left outside mildew can grow in the contained due to the moisture. As a result, there is a need to be able to clean the interior of the container from time to time. One approach to having a container that may be cleaned is to provide a container with a large orifice that would permit a brush or other cleaning instrument to access to the interior of the container. Another approach is disclosed in co-pending U.S. patent application Ser. No. 09/739,453 filed Dec. 18, 2000, which discloses a reservoir with a removable cap or cover to provide access to the interior for cleaning purposes.

One problem that arises with the use of a removable cap or cover is the seal between the outside air and the fluid in the container at the interface between cover and the remainder or body of the container. When a container or other reservoir is used that has only a single opening or orifice for the water to be released into the tray this orifice is usually placed in the tray such that water flows out of the reservoir into the tray until an equilibrium is reached between the level of the water in the tray and the remaining water in the reservoir. As the pet drinks water from the tray additional water is released from the reservoir to refill the container until a new equilibrium is achieved. This continues until all the water is removed from the reservoir and flows into the tray. Where there is a removable cover as well as the orifice for dispensing water, the seal between the cover of the reservoir and the body of the reservoir must relatively impermeable to air entering the container. If it is not, the pressure of the air entering the reservoir through this permeable seal forces all the water in the container to flow into the tray. As a result, the seal between the cover and the body is preferably a tight one to prevent air from entering the container. However, if the seal is made too tight, the cover becomes difficult to remove for cleaning and the purpose of the removable cover is lost.

OBJECTS OF THE INVENTION

It is an object of the present invention to provide an improved pet waterer that can supply sufficient quantities of water to a pet over a period of time It is also an object of the present invention to provide an improved pet waterer that has a reservoir that is easy to clean.

It is an object of the present invention to provide an improved pet waterer that has a reservoir for holding the fluids that is openable for cleaning.

It is an object of the present invention to provides a pet waterer that has a reservoir for holding a fluid that is openable for cleaning but does not permit air to enter the reservoir and cause the water or other fluid to prematurely exit the reservoir into a tray.

It is another object of the invention to provide a pet waterer that will only permit a slight increase of water to flow into the tray if there is a leak at the seal between the lid and the container.

SUMMARY OF THE INVENTION

The present invention is directed to an improved pet waterer that has a tray for the pet to imbibe a fluid such as water and a container for maintaining a fluid in the tray as well as an improved valve for dispensing water or other fluid into the tray. The container that holds the fluid has a base and one or more sidewalls extending from said base and ending in an edge. The edge forms an opening in the container for cleaning and filling. The opening in the container is covered with a removable lid that has an orifice present therein for dispensing fluid the pet when the container is inverted and placed into the tray. The removable lid may be adhered to the edge formed by the sidewall by any suitable means. Unlike the prior art containers used in pet waterers, the interface between the removable lid and the edge of the container need not be a perfect seal as the interface formed by the removable lid and the edge when a fluid is present is a stronger seal than the same interface when there is air present. Nevertheless, the seal between the lid and the container is generally leak proof because of its position in the arrangement of the valve, lid and container.

The water level in the dish is determined by the height of the valve. The lower the valve the lower the water level in the dish. If the seal between the lid and the container body fails and water is allowed to leak, the height of the seal not the valve now determines the height of the water in the dish. In the present invention the height of the seal is designed to be only slightly above the valve. If there were a leak at the seal, the seal height would now determine the water level. In the prior art waterers the seal height is much higher than in the present invention thus permitting more water to flow into the tray and possibly causing a leak. In the present invention the height of the seal would only be slightly higher than the desired level of the valve thus only permitting a slight increase of water into the tray.

BRIEF DESCRIPTION OF THE DRAWINGS

FIG. 1 is a representative pet waterer that has a reservoir for holding water and a dispensing tray, which permits the pet to drink from.

DETAILED DESCRIPTION OF THE INVENTION

Figure 1:
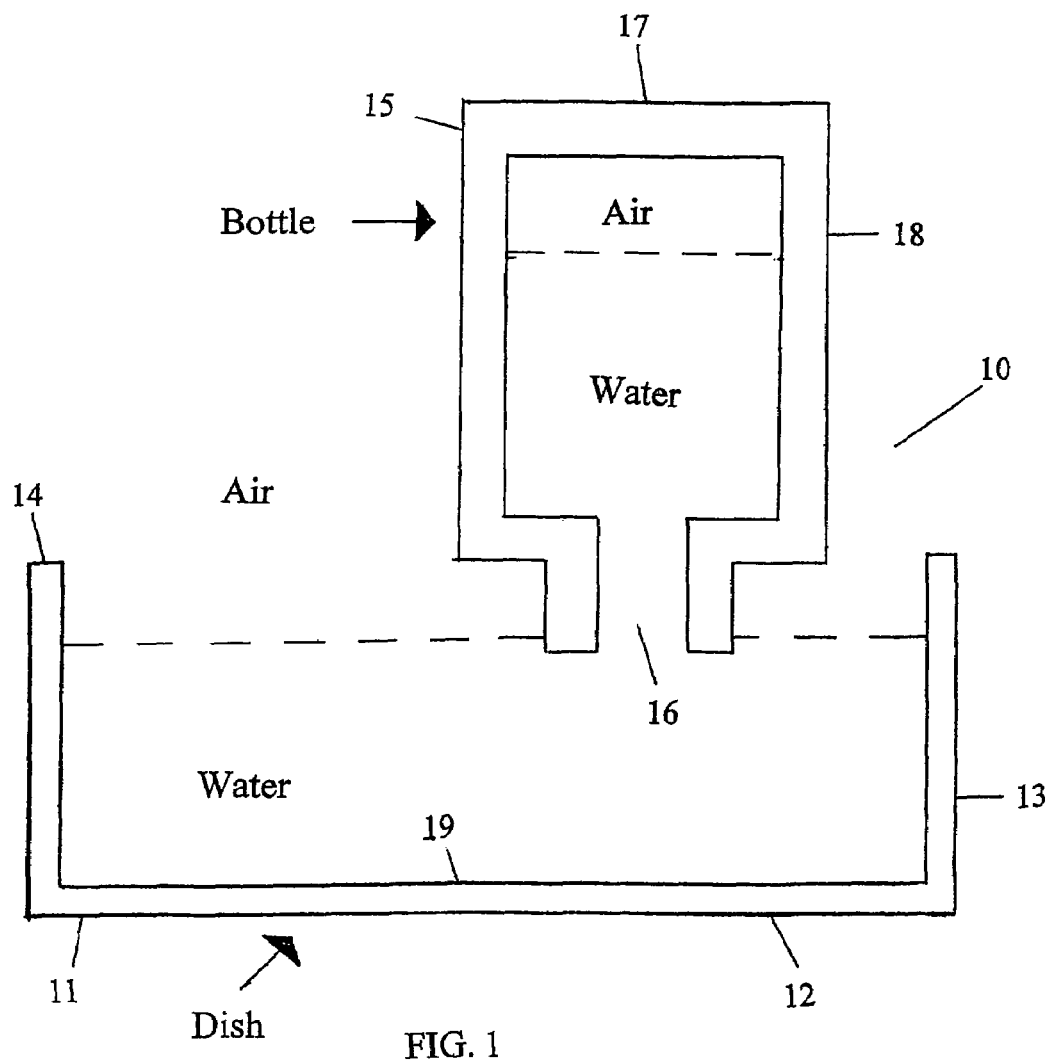

FIG. 1 depicts a representative pet waterer 10 that has a dish or tray 11 for providing a fluid such as water to a pet. The tray may be of any shape that is well known in the art for these types of products. Typically, these trays have a flat base 12 and a sidewall 13 that extends upwardly from the base to retain the fluid. Depending on the shape of the tray, there may be one or more sidewalls 13. The sidewall 13 ends in a top edge 14. Water or other fluid may be placed in the tray for use by a pet as needed. Extending upwardly from the base is at least one container or reservoir 15 for holding additional water for dispensing into the tray as the water in the tray is either used or evaporates. The container has an orifice 16 located at the lower end of the container when the container is inverted for dispensing water as shown in FIG. 1. The container also has a base end 17 and one or more sidewalls 18. The container is filled by removing it from the tray and transported to a fluid source. Water, for example, is poured from a spigot or faucet into the orifice 16. Once the container is suitably filled it is returned to the tray where it is inverted and the orifice positioned downwardly into the tray so that the water in the container flows into the tray. The level of the water in the dish is controlled by the location of the opening of the container in relation to the tray. The greater the distance from the inside base surface 19 of the tray, the higher the level of the water in the tray. The water in the dish prevents air from entering the container 15 and as a result water cannot leave the container until the pet drinks some of the water in the tray or the water in the tray evaporates. In other words, when the container has water or other fluid present, the air pressure in the container is less than the outside air pressure and as a result, the water remains in the container. Once the water level is reduced in the tray due to evaporation or usage by a pet, water from the container enters the tray until a new equilibrium is achieved.

Figure 2:
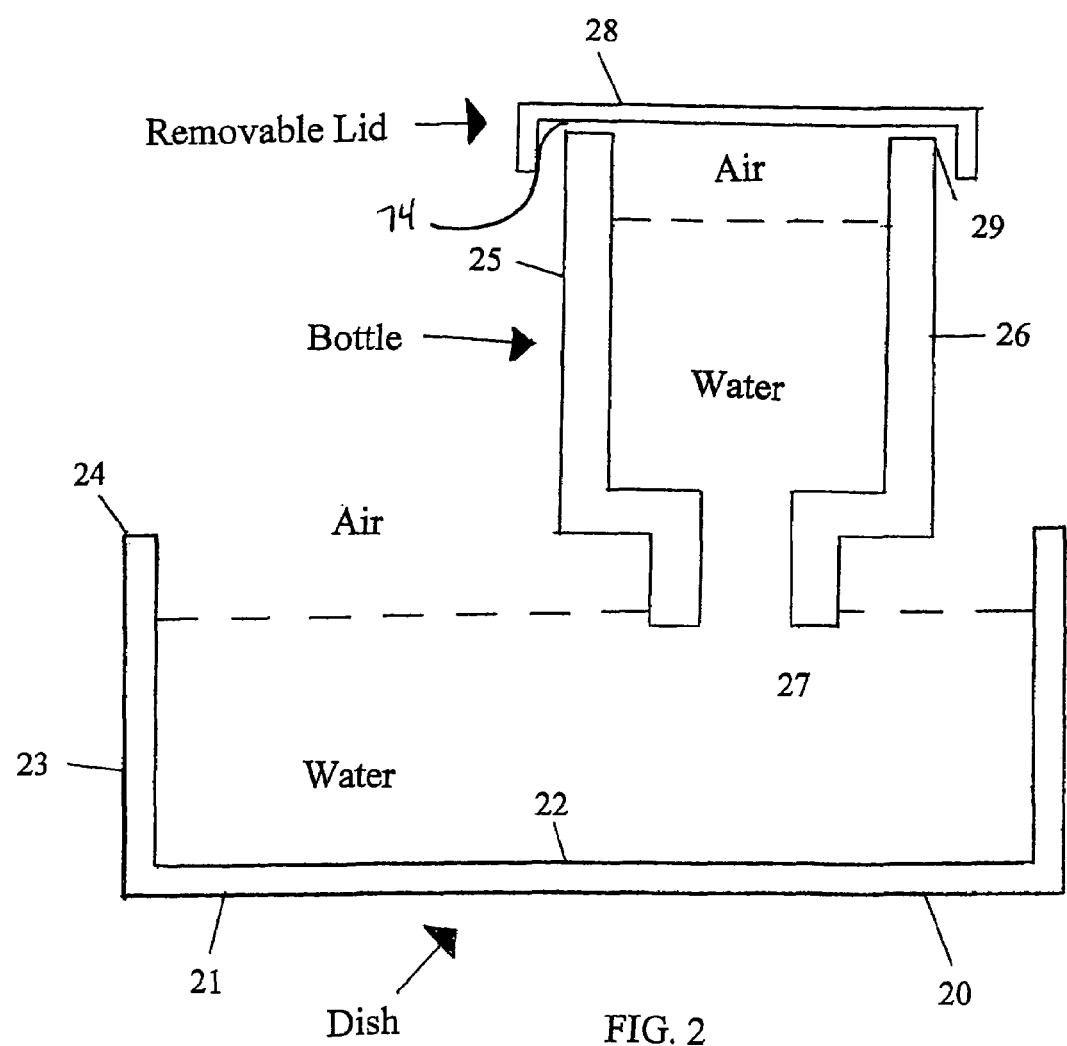
FIG. 2 is a representative pet waterer that has a reservoir for holding water and a dispensing tray which permits the pet to obtain a drink and wherein the reservoir has a removable lid opposite the dispensing orifice of the reservoir for providing access to the interior of the reservoir for cleaning.

FIG. 2 shows another type of a tray or dish 20 for water or other fluid for use with a pet. The tray has an exterior base surface 21 and an interior base surface 22. Extending upwardly from the base surface is a sidewall 23. The sidewall ends in a top edge 24. A container or reservoir 25 is also present with the tray. The container has a sidewall 26 and is provided with an orifice 27 at one end of the container. At the opposite end of the container there is a removable lid 28. The removable lid 28 may be connected to the sidewall of the container by any suitable means. The removable lid is advantageous because it permits the pet owner to clean the interior of the container to remove dirt and debris as well as the scale that frequently builds up due to hard water in many locales. The problem that is encountered with the removable lid is that if any air enters the container through the interface 29 between the removable lid 28 and the sidewall of the container the air pressure in the container increases and this increase in pressure causes more water to leave the container and enter the tray. This additional water can cause the water or other fluid to flow over the top edge 24 of the sidewall onto the surrounding floor or other surface. If the seal at the interface is airtight, then no air will enter the container at this interface and there will be no increase in air pressure. However, in order to render the interface airtight increases the cost of the pet waterer significantly over the containers that do not have a removable lid.

Figure 3:
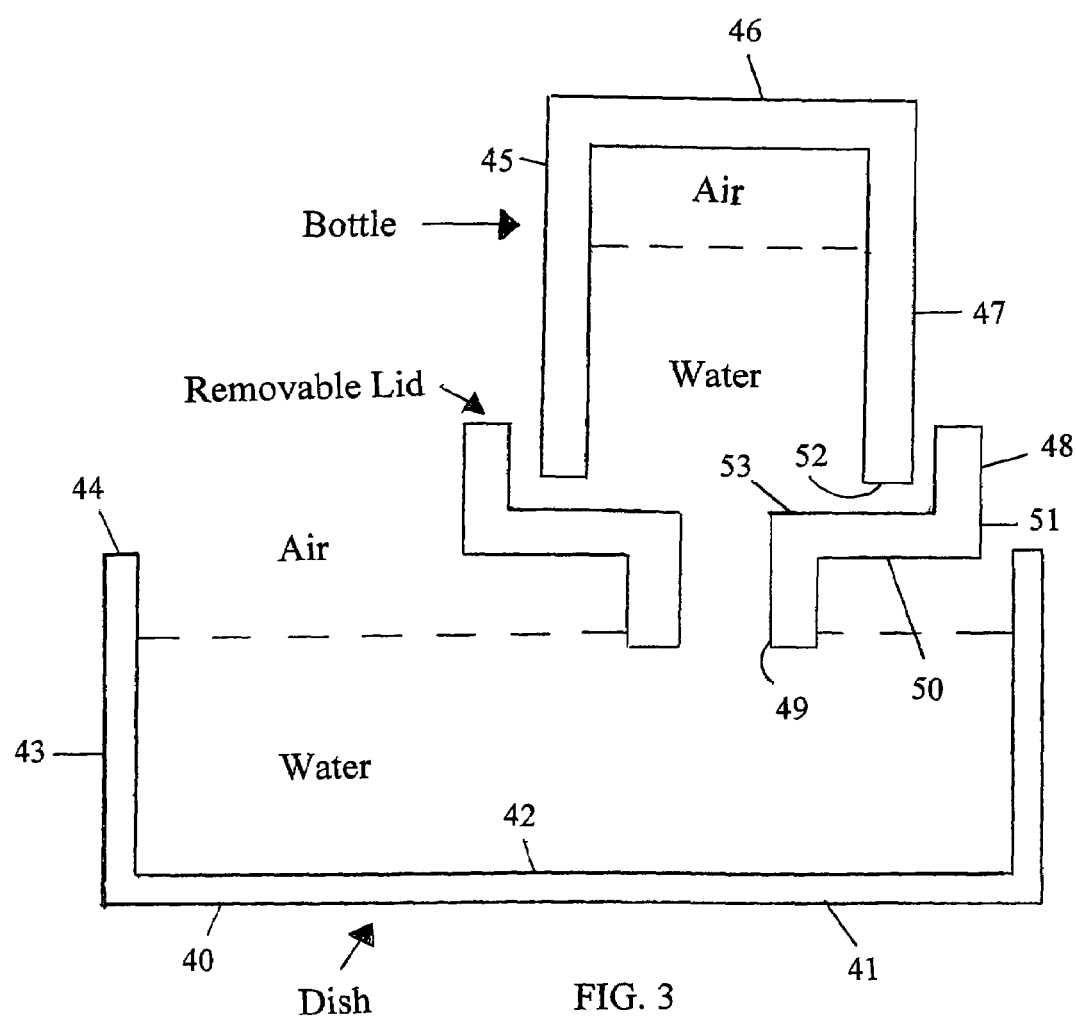
FIG. 3 is a pet waterer of the present invention showing a reservoir for holding water or other fluid and a dispensing tray. The reservoir is provided with a removable lid that is provided with a dispensing orifice to facilitate cleaning the interior of the reservoir.
Figure 5:
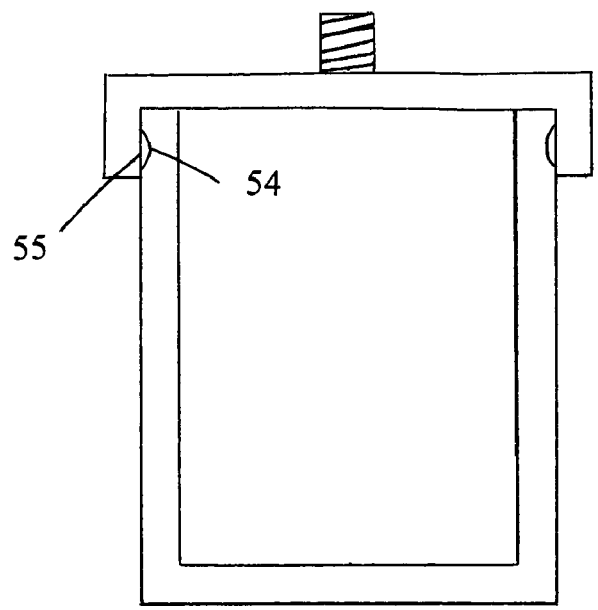
FIG. 5 shows one example of the interface between the removable lid and the container.
Figure 4:
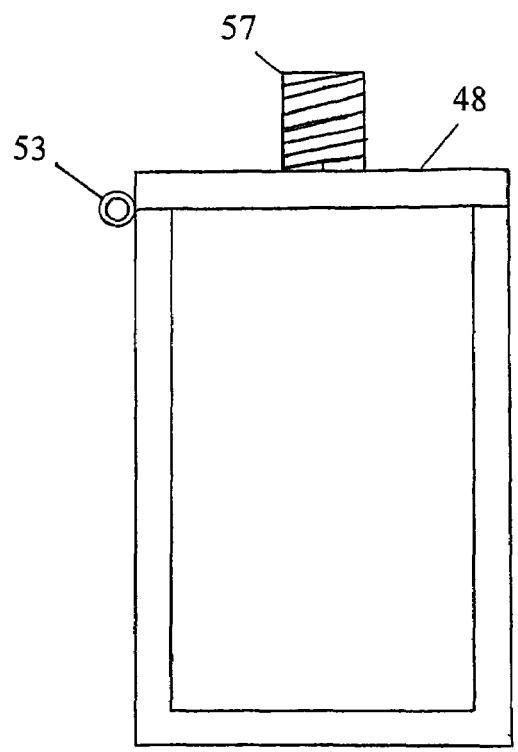
FIG. 4 shows a removable lid connected to said container.

FIG. 3 shows the pet waterer of the present invention. This pet waterer provides a container that may be readily cleaned but which does not have the problems associated with the container of FIG. 2. As seen in FIG. 3 there is a tray or dish 40 for water or other fluid for use with a pet. The tray has an exterior base surface 41 and an interior base surface 42. Extending upwardly from the base surface is a sidewall 43. The sidewall ends in a top edge 44. A container or reservoir 45 is also present with the tray. The container has a base 46 and a sidewall 47. The container is provided with removable lid 48 having an orifice 49 at the end of the container opposite the base. The orifice may be merely an opening in the lid or can have a neck 57. The neck may be threaded if the tray connection (not shown) requires it. The removable lid of the container 48 having the orifice 49 may have a breast 50 that extends from the orifice and an end wall 51. The edge 52 of sidewall 47 of the container may rest on the interior surface 53 of the removable lid in one embodiment. One of the major features of the present invention is that there is no need to have a complex connection between the removable lid and the container to prevent leaking. In another embodiment, the removable lid 48 may be connected to the sidewall of the container by any suitable means. For example, the removable lid may be hingedly connected to the container so that the lid can be raised and lowered with becoming separated from the container. As seen in FIG. 4, along one edge of the container there is a hinge 53 that is connected to the removable lid. Various hinged connections are well known to those skilled in the art. In another embodiment as seen in FIG. 5, the may be provided with a protrusion 55 that extends into recess 54 in the sidewall of the container. This retaining means need not provide an airtight seal to hold the fluid in the container when the container is inverted. Alternatively, the protrusion may be placed on the sidewall of the container and the recess on the interior of the lid surface.

Figure 8:
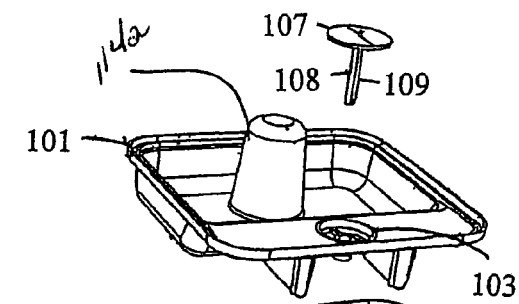
FIG. 8 shows a representative tray and container of the present invention
Figure 8:
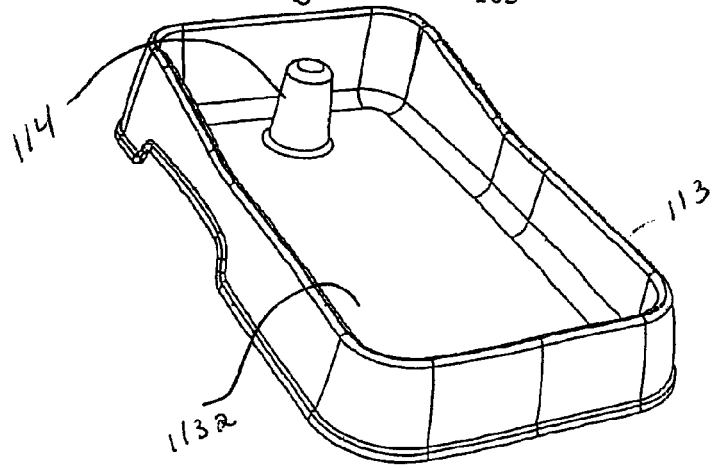

Referring now to FIG. 8. baffles 115 and 116 are disposed on the bottom side of the bottom member 101 and are made from the same material. The baffles 115 and 116 extend from the bottom surface of the bottom member 101 and support the bottom member 101 to prevent tipping and spilling when removed from the tray.

Figure 6:
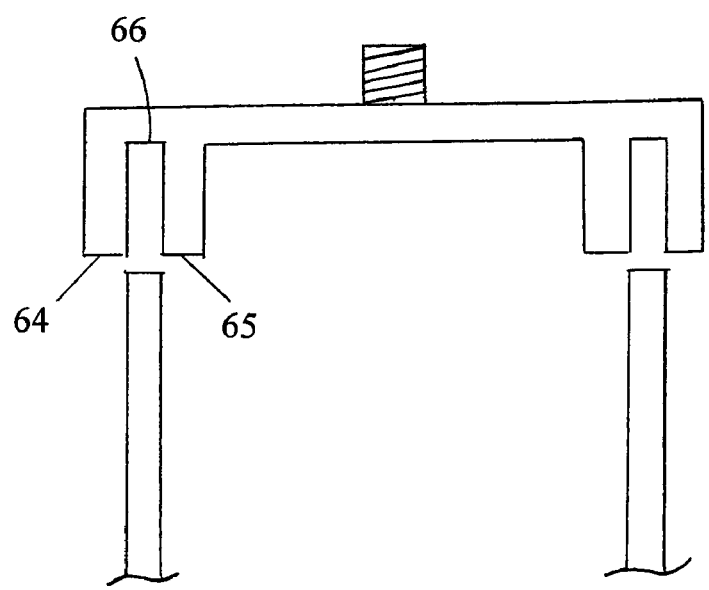
FIG. 6 shows another example of the interface between the removable lid and the container.

As seen in FIG. 6, either the removable lid or the container may be provided with a first top edge 64 and a second top edge 65 connected together by a member 66. The first top edge and the second top edge are separated from each other by a distance, "X." The distance "X" is preferably about the thickness of the sidewall 47 of the container if the edges are on the removable lid. Alternatively, if the dual edges are placed on the sidewall of the container, the distance "X" of member 66 should be the thickness of the end wall 51.

Figure 7:
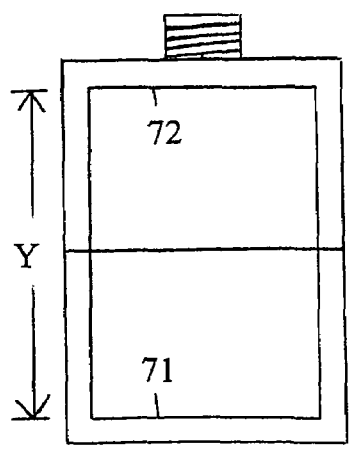
FIG. 7 shows an alternate embodiment of the container of the waterer of the present invention.
Figure 9:
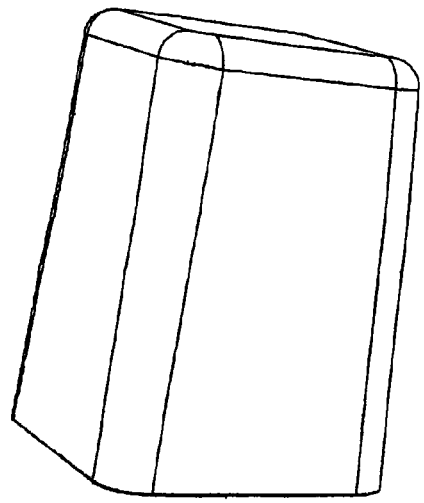
FIG. 9 shows a valve means for dispensing water in the waterer of the present invention.
Figure 9:
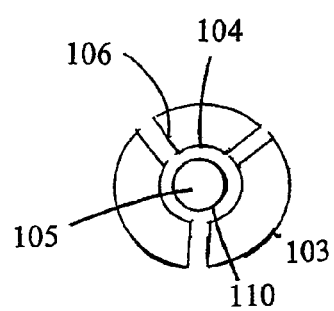

Although the lid has been shown as covering the open end of the container, there are a variety of other arrangements that may employ the teachings of the present invention. For example, as seen in FIG. 7, the distance from the interior base surface 71 to the interior lid surface 72 is "Y". Preferably, the distance from the interior lid surface 71 to the edge of the sidewall 73 is less than one-half (½)"Y" and more preferably, less than one quarter (¼)Y. Most preferably, the distance from the interior lid surface 71 to the edge of the sidewall is as short as possible. The shorter this distance is, the greater volume of water that may be dispensed into the tray before there is an air-to-air seal at the interface 74 between the lid and the container.

It has been found that by placing the orifice for dispensing fluids in the removable lid provides all the benefits of the ability to clean the interior of the container without the risk that the inflow of air will cause the water to flow from the container unnecessarily. The present invention provides a "water to air" seal that is considerably stronger than the traditional "air to air" seal obtained by the waterers of the prior art. In addition, the pressure differential across the seal is quite low. The pressure differential is calculated based on the difference in height between the seal and the surface of the water in the dish since that difference is quite small the pressure differential is also quite small for the waterer of the present invention compared to the prior art waterers. Another advantage of the present invention is that the removable lid permits the container to be made by injection molding instead of the less effective blow molding process. Prior art lidless containers had small opening in a relatively large bottles and had to be blow molded instead of injection molding as a manufacturing technique.

The present invention is less prone to leaking because it is sealing water and not air. The location of the lid at the bottom of the inverted container near the level of the opening renders the container less prone too leaking also. This is because the pressure differential between the inside of the container and the atmosphere is very small. This differs from the situation where you have a top lid that places the critical lid seal at a location that maximizes the pressure differential between the interior of the container and the atmosphere. Furthermore even if the lid and container of the present invention did leak at the lid container seal about the worst that could happen is that the water level would rise slightly to the level of the seal, which is still below the rim of the tray or base.

The orifice of the waterer of the present invention may be provided with a valve system to regulate the flow of water from the pet waterer, as seen in FIG. 8. As noted above, pet waterers are typically filled by a spigot and transported from there to the tray this frequently causes spilling and leakage. Accordingly, it is preferred that there be a valve means connected to the orifice of the waterer. The valve means may be any suitable valve means known to those skilled in the art.

In a preferred embodiment, the receptacle may be provided with an orifice 103 for passing water to the tray. The orifice 103 is provided with a ring 104 having an open center section 105. The ring may be retained in the orifice by a plurality of supports 106. The valve disk 107 has a stem 108. The valve stem 108 is seated in the open center section 105 of the ring 104. The stem 108 preferably has a notch 109 extending along a portion of its length. A nub 110 extending from the inside surface of the ring enters the notch 109 in the stem 108 and retains the valve in the valve means. In order to fill the receptacle for the waterer, the receptacle is lifted from the tray. As the receptacle is lifted the valves stem 108 drops downwardly in the ring 104 causing the valve disk 107 to block the orifice 103 and prevent excessive water from escaping from the receptacle. In addition, located on exterior base surface 113a of tray 113 may be post 114. Post 114 may extend in a generally upward direction perpendicular to exterior base surface 113a also seen in FIG. 8. In normal operation post 114 may mate with receiving member 114a. Typically, depending on the tolerances of the parts only a negligible amount of water should leak when the receptacle is lifted off of the tray. When the user is at the sink or other location for filling the receptacle, the container may be filled through the valve. Alternatively, the bottom member 101 may be removed and the receptacle is filled and the bottom member is replaced. When the filled receptacle is returned to the tray, the receptacle is inverted so that the bottom member 101 is positioned downwardly with the valve disk in place to prevent water from spilling. As the receptacle is lowered onto the tray the valve stem contacts the upper surface of the tray. The contact of the stem with the upper surface causes the valve disk to rise thus opening the receptacle to permit water to flow from the receptacle into the tray for the pet to drink. The valve preferably remains open throughout the time the container is positioned in the tray. In some instances a portion of the upper surface of the tray may be provided with a raised portion that permits the stem to be shorter. The advantage of a shorter stem is that there is less risk that imperfections in the resting surface could cause the stem to push the disk upwardly and open the orifice thus causing fluid to leak from the receptacle, when the receptacle is removed from the tray or placed for example on a countertop or elsewhere.

Preferably the valve seat is located on the inside of the container so that when opening the valve is moved toward the center of the container and when closing the valve is moved away from the center of the container. In order to facilitate closing of the valve by gravity when water is present in the container it is preferred that the valve be made of a material having a density greater than the density of the liquid in the container, so that buoyancy does not counteract the desired effect of valve closure. More specifically, it is preferred that the valve be made of a plastic material that is heavier and more dense than the remainder of the waterer. Preferably, the valve is made from a plastic material having a specific gravity of 1.5 or greater. Water has a specific gravity of 1.00. The greater specific gravity permits the valve to open and shut easily when submerged in the water.

Shortly after inverting the filled container the valve will shut and no liquid will flow. The combination of the sealed nature of the container with any natural surface tension in the liquid helps prevent leakage of fluid even if the seal is not perfect. When the container is placed in a tray contact between the pin and the surface of the tray causes the valve to open. When the valve is opened, the liquid is allowed to escape the container and continues to do so until the level of the liquid in the tray reaches the height of the opening in the container. Once that condition is reached no additional air can enter the container to replace the liquid being released by the container. Fluid will continue to be released from the container until the pressure of the air inside the container drops sufficiently to counterbalance the weight of the fluid remaining in the container.

I claim:

1. A pet waterer comprising a tray for holding a fluid and extending upwardly from said tray; a container for dispensing fluid to said tray, said container comprising a base and one or more side walls extending from said base and having a top edge, said top edge forming an opening in said container opposite said base, said container having thereon a removable lid covering said opening in said container, said lid having an orifice for passing fluid from said container to said tray, said orifice having a ring having an open center section and being retained in said orifice by at least one support extending from the ring to the lid, and wherein said ring receives a stem extending from a valve disk for sealing the orifice; said tray having a post in said tray, said post mating with a receiving member in the lid of the container.

2. A pet waterer according to claim 1 wherein said base has an interior base surface and a lid has an interior lid surface and the distance from the interior lid surface to the top edge of the tray sidewall is less than one half the distance from the interior base surface to the interior lid surface.

3. The pet waterer according to claim 2 wherein said container base has an interior base surface and the lid has an interior lid surface and the distance from the interior lid surface to the top edge of the tray sidewall of said container is less than one quarter of the distance from the interior base to interior lid surface.

4. The pet waterer according to claim 2 wherein said base has an interior base surface and the lid has an interior lid surface and the distance from the interior lid surface to the top edge of the tray sidewall of the said container is less than one tenth of the distance from the interior base surface to the interior lid surface.

5. The pet waterer according to claim 1 wherein said base has an interior base surface and the lid has an interior lid surface and the top edge of the sidewall of said container contacts said interior surface.

6. The pet waterer according to claim 1 wherein when said container is positioned in said tray there is a "fluid to air" seal between the lid and the container when a fluid is present in the container.

7. The pet waterer according to claim 1 wherein said container has a neck that is insertable into said tray.

8. The pet waterer according to claim 7 wherein the neck is threaded.

9. The pet waterer according to claim 1 wherein the valve stem has a notch extending along a portion of its length and said ring having a nub which enters said stem and retains said valve disk in said ring.

10. A pet waterer comprising a tray for holding a fluid and extending upwardly from said tray; a container for dispensing fluid to said tray, said container comprising a base and one or more side walls extending from said base and having a top edge, said top edge forming an opening in said container opposite said base, said container having thereon a removable lid covering said opening in said container, said lid having an orifice for passing fluid from said container to said tray, said orifice in said lid having a valve therein, said valve having an open position and a closed position, said valve having an open position when said container is in said tray and a portion of said valve contacts a surface of said tray and closed position when said container is removed from said tray; said orifice having a ring having an open center section and being retained in said orifice by at least one support extending from the ring to the lid, wherein said ring receives a stem extending from a valve disk for sealing the orifice; wherein the stem has a notch extending along a portion of its length and said ring has a nub which enters said notch in said stem and retains said valve disk in said ring.

11. A pet waterer comprising a tray having a tray base and a tray sidewall forming an area for a pet to drink from and a container having a container base and one or more container sidewalls extending from said container base and having a top edge, said top edge forming an opening in said container opposite said container base, said container having thereon a removable lid covering said opening in said container, said lid having an orifice for passing fluid from said container when said container is positioned in a tray such that said orifice in said removable lid is a distance from the base of said tray and wherein said orifice permits any fluid in said container to flow into said tray as the fluid level in said tray falls below the level of the orifice in said container, wherein said orifice has a ring having an open center section and being retained in said orifice by at least one support extending from the ring to the lid, said ring receives a stem extending from a valve disk for sealing the orifice; wherein the stem has a notch extending along a portion of its length and said ring has a nub which enters said notch in said stem and retains said valve disk in said ring.

12. A pet waterer according to claim 11 wherein said base has an interior base surface and the lid has an interior lid surface and the distance from the interior lid surface to the top edge of the tray sidewall is less than half the distance from the interior base surface to the interior lid surface.

13. The pet waterer according to claim 12 wherein said container base has an interior base surface and a lid has an interior lid surface and the distance from the interior lid surface to the top edge of the tray sidewall of said container is less than one quarter of the distance from the interior base surface to the interior lid surface.

14. The pet waterer according to claim 12 wherein said container base has an interior base surface and the lid has an interior lid surface and the distance from the interior lid surface to the top edge of the tray sidewall of said container is less than one tenth of the distance from the interior base surface to the interior lid surface.

15. The pet waterer according to claim 11 wherein said base has an interior base surface and the lid has an interior lid surface and the tip edge of the sidewall of said container contacts said interior lid surface.

16. A pet waterer comprising a tray for holding a fluid and extending upwardly from said tray, a container for dispensing fluid to said tray, said container comprising a base and one or more side walls extending from said base and having a top edge, said top edge forming an opening in said container opposite said base, said container having thereon a removable lid covering said opening in said container, said lid having an orifice for passing fluid from said container to said tray said lid having one or more baffles integral therewith extending downwardly therefrom to permit the receptacle to stand upright when removed from the tray, and wherein said receptacle has a valve means to prevent leakage of water from said orifice in said lid and, wherein said lid of said container has an orifice passing fluid to the tray, said orifice having a ring having an open center section, said ring being retained in said orifice by at least one support extending from the ring to said receptacle, and wherein said ring receives a stem extending from a valve disk for sealing the orifice.

17. A pet waterer comprising a tray for holding a fluid and extending upwardly from said tray; a container for dispensing fluid to said tray, said container comprising a base and one or more side walls extending from said base and having a top edge, said top edge forming an opening in said container opposite said base, said container having thereon a removable lid covering said opening in said container, said lid having an orifice for passing fluid from said container to said tray, said lid has one or more baffles extending downwardly therefrom, wherein a receptacle has a valve means to prevent leakage of water from the waterer in said orifice in said lid, wherein said lid of said container has an orifice passing fluid to the tray, said orifice having a ring having an open center section said ring being retained in said orifice by at least one support extending from the ring to said receptacle, and wherein said ring receives a stem extending from a valve disk for sealing the orifice; a post in said tray, said post mating with a receiving member in the lid of the container.

18. The pet waterer according to claim 17 wherein the valve stem has a notch extending along a portion of its length and said ring has a nub which enters said notch in said stem and retains said valve disk in said ring.

* * * * *